United States Patent
Wang et al.

(10) Patent No.: US 11,287,303 B2
(45) Date of Patent: Mar. 29, 2022

(54) FLOW RATE MEASURING METHOD

(71) Applicant: NATIONAL CHIAO TUNG UNIVERSITY, Hsinchu (TW)

(72) Inventors: Chi-Chuan Wang, Qionglin Township (TW); Tran Ngoc Tan, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 119 days.

(21) Appl. No.: 16/854,512

(22) Filed: Apr. 21, 2020

(65) Prior Publication Data
US 2021/0325233 A1    Oct. 21, 2021

(51) Int. Cl.
*G01F 25/10* (2022.01)
*G01F 1/66* (2022.01)
*G01F 1/667* (2022.01)
*G01N 29/44* (2006.01)
*G01N 29/30* (2006.01)

(52) U.S. Cl.
CPC .............. *G01F 25/10* (2022.01); *G01F 1/662* (2013.01); *G01F 1/667* (2013.01); *G01N 29/30* (2013.01); *G01N 29/4418* (2013.01); *G01N 29/4472* (2013.01)

(58) Field of Classification Search
CPC . G01F 1/66; G01F 1/667; G01F 1/662; G01F 25/0007; G01N 29/02; G01N 29/024; G01N 29/036; G01N 29/30; G01N 29/4418; G01N 29/4472
See application file for complete search history.

(56) References Cited

U.S. PATENT DOCUMENTS

| | | | | |
|---|---|---|---|---|
| 5,546,812 A | * | 8/1996 | Drenthen | G01F 1/662 73/861.29 |
| 6,305,232 B1 | * | 10/2001 | Ohle | G01F 1/3254 73/1.16 |
| 2008/0134798 A1 | * | 6/2008 | Li | G01F 1/663 73/861.25 |
| 2009/0211330 A1 | * | 8/2009 | Froehlich | G01F 25/0007 73/1.16 |

* cited by examiner

*Primary Examiner* — Benjamin R Schmitt
(74) *Attorney, Agent, or Firm* — Birch, Stewart, Kolasch & Birch, LLP

(57) ABSTRACT

The present invention relates to a flow rate measuring method comprising: establishing a database which includes a plurality of flow profiles; measuring the flow in a flow field using a plurality of transducers wherein in between every two transducers there exists an acoustic path which indicates the flow speed of the flow between the two transducers, and a feature map can be derived from the flow speeds; comparing the feature map with the database; selecting a matching flow profile from the flow profiles wherein the matching flow profile has a plurality of weighting functions corresponding to the acoustic paths; and calibrating the flow speed using the weighting functions.

8 Claims, 6 Drawing Sheets

FLOW RATE MEASURING METHOD

BACKGROUND OF THE INVENTION

1. Field of the Invention

The present invention generally relates to a flow rate measuring method, in particular, a flow rate measuring method to calibrate a flow profile in a flow field.

2. Description of the Prior Art

Flow meters are an essential necessity for humankind. An example would be leakage detection or flow control. Along with the development of human society and technology, many types of flow meters were proposed, including ultrasonic, differential pressure, positive displacement, turbine, vortex, and thermal and multiphase flow meters. Among which, ultrasonic flow meters have many more advantages, including bi-directional measurement, non-intrusive measuring flow, and no moving parts, compared to other types. Hence, the operating costs and maintenance costs of the ultrasonic flow meters are lower than other flow meters with different mechanisms.

However, the ultrasonic flow meters still have its disadvantages. One of which is its measuring accuracy. Indeed, in real-life conditions, the flows may not be centrally symmetric or fully developed, and the reason may be bent pipes or short pipes, but not limited thereto. Because the acoustic path of the ultrasonic flow meter cannot cover the whole area of the cross section of the pipe, the accuracy of the ultrasonic flow meter is affected by the asymmetric flow and the none-fully developed flow. This problem may be eliminated by increasing the amount of the transducer. Nonetheless, when the amount of the transducer is increased, the manufacturing cost of the ultrasonic flow meter will be increased. Furthermore, the size of the ultrasonic flow meter will be enlarged; as a result, the ultrasonic flow meter has to occupy a larger assembly space.

SUMMARY OF THE INVENTION

One of the purposes of the present invention is providing a simulation method to generate a database which includes a plurality of flow profiles.

One of the purposes of the present invention is providing a calibration mechanism to increase the accuracy of the ultrasonic flow meter.

One of the purposes of the present invention is providing an arrangement of transducers to increase the accuracy of the ultrasonic flow meter but not increase the number of transducers compared to conventional ultrasonic flow meters.

In an embodiment, a flow rate measuring method of the present invention comprises: establishing a database which includes a plurality of flow profiles; measuring the flow in a flow field using a plurality of transducers wherein in between every two transducers there exists an acoustic path which indicates the flow speed of the flow between the two transducers, and a feature map can be derived from the flow speeds; comparing the feature map with the database; selecting a matching flow profile from the flow profiles wherein the matching flow profile has a plurality of weighting functions corresponding to the acoustic paths; and calibrating the flow speed using the weighting functions.

Using the proposed methods, the accuracy of the ultrasonic flow meter will not be affected by the asymmetric flow and the none-fully developed flow. Consequently, the proposed methods can further save the costs of ultrasonic flow meter.

DETAILED DESCRIPTION OF THE PREFERRED EMBODIMENT

Figure 1B:
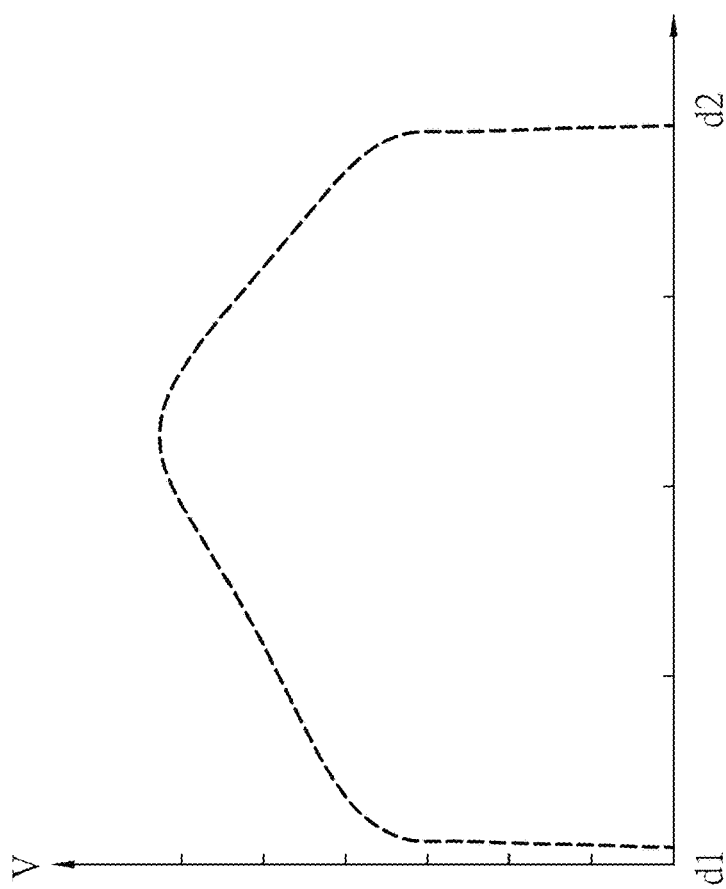
FIGS. 1A and 1B are velocity distribution schematics of an asymmetric flow.

The connecting elements according to the present invention will be described in detail below through embodiments and with reference to the accompanying drawings. A person having ordinary skill in the art may understand the advantages and effects of the present disclosure through the contents disclosed in the present specification. However, the contents shown in the following sentences never limit the scope of the present disclosure. Without departing from the conception principles of the present invention, a person having ordinary skill in the present art may realize the present disclosure through other embodiments based on different views and applications. In the attached Figures, for the purpose of clarification, the thicknesses of layers, films, panels, regions and the like are amplified. In the whole specification, the same marks represent the same element. It should be understood that, when an element such as a layer, a film, a panel, a region or a substrate are described as "being on" or "being connected to" another element, they may be directly on or connected to another element, or there may be other elements therebetween. On the other hand, when an element is described as "directly exists on another element" or "directly connects to another element", there is no element therebetween. As used in the present specification, a "connection" may be a physical and/or electrical connection. In addition, an "electrical connection" or "coupling" means that other elements may exist therebetween.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

In addition, relative terms such as "lower" or "bottom" and "on" or "top" may be used to describe the relationship between an element and another element in the present specification, as shown in the Figures. It should be understood that, the purpose of using relative terms is to include the different directions of the devices not shown in the Figures. For example, if a device in an attached Figure is turned upside down, an element described as being "under" another element will be "on top of" that element. Therefore, a descriptive term "under" may include the meaning of both "under" and "on top of", depending on the specific orientation of the attached Figure.

The terms "about", "approximate" or "essentially" used in the present specification include the value itself and the average values within the acceptable range of deviation of the specific values confirmed by a person having ordinary skill in the present art, considering the specific measurement discussed and the amount of errors related to such measurement (that is, the limitation of the measurement system). For example, "about" may mean within one or more standard deviations of the value itself, or within ±30%, ±20%, ±10% or ±5%. In addition, "about", "approximate" or "essentially" used in the present specification may select a more acceptable range of deviation or standard deviation based on optical property, etching property or other properties. One cannot apply one standard deviation to all properties.

Figure 1A:
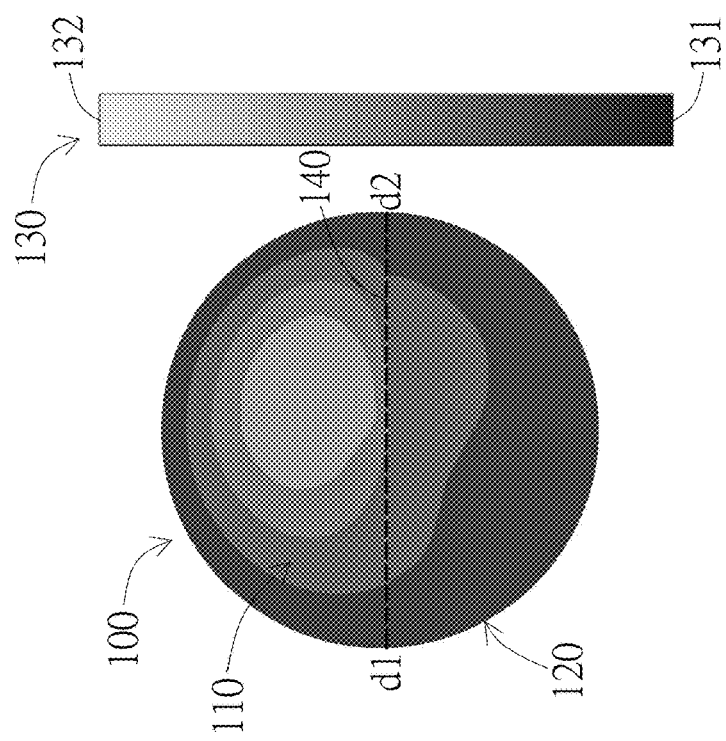
Figure 2:
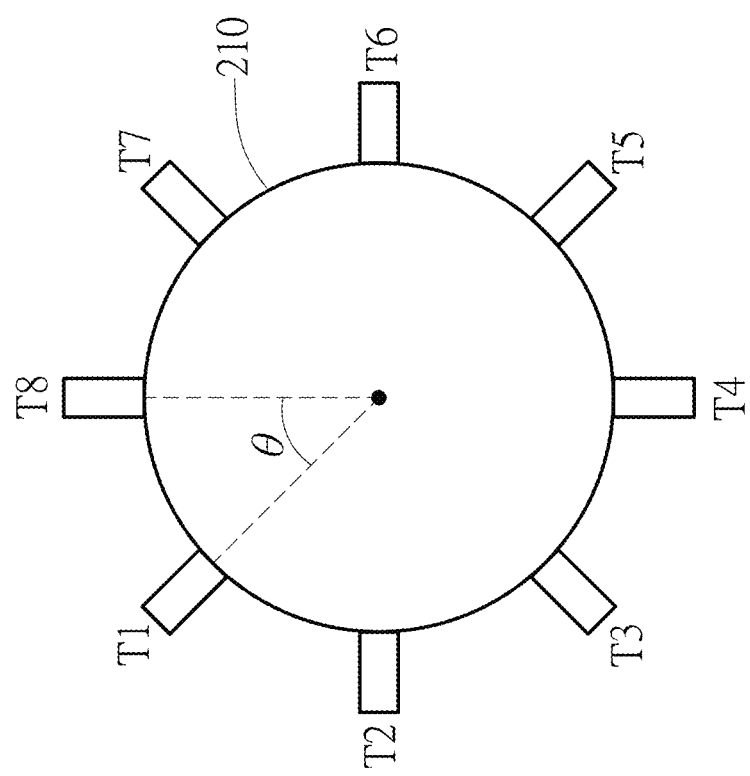
FIG. 2 is a schematic view of an exemplary arrangement of transducers of an embodiment.

FIG. 1A shows a flow profile 100 of the asymmetric flow 110. As shown in FIG. 1A, the asymmetric flow 110 is flowing in the flow field 120. It should be understood that the asymmetric flow 110 shown in FIG. 1A is a cross-section view. The flow rate distribution bar 130 shows that the color gradient, from the dark end 131 to the light end 132, represents the flow rate of the asymmetric flow 110 from low to high. The FIG. 1B shows the flow rate distribution of the chord 140, represented by the dash line from d1 to d2. The x-axis of FIG. 1B is indicated by the line from d1 to d2 and the y-axis of FIG. 1B is indicated the flow rate V. It can be understood that the flow rate distribution of the chord 140 does not represent the real flow rate and/or the maximum flow rate of the fluid. Hence, the measuring accuracy will be decreased. The following paragraph will describe the working principle of the present invention The Arrangement of the Transducers FIG. 2 shows an arrangement of the transducers of an embodiment. As shown in FIG. 2, the ultrasonic flow meter includes a plurality of transducers T1-T8 arranged around the flow field 210. More specifically, the ultrasonic flow meter includes eight transducers T1-T8. It should be noted that the number of the transducers are similar to other commercial ultrasonic flow meters. The flow field 210 can be a pipe, a tube or any fluid carriers. The transducers T1-T8 are arranged around the flow field 210 uniformly. For example, if the shape of the flow field is a circle, the transducers T1-T8 will be spaced out evenly along the circumference of the circle. In other words, if the eight transducers T1-T8 are arranged around the flow field 210, the angle θ between each pair of two adjacent transducers will be 45 degrees. However, the number of transducers does not limit the present invention. For example, the number of transducers can be more or less than eight. The number of transducers depends on the cost, assembly space and other possible reasons.

Figure 3B:
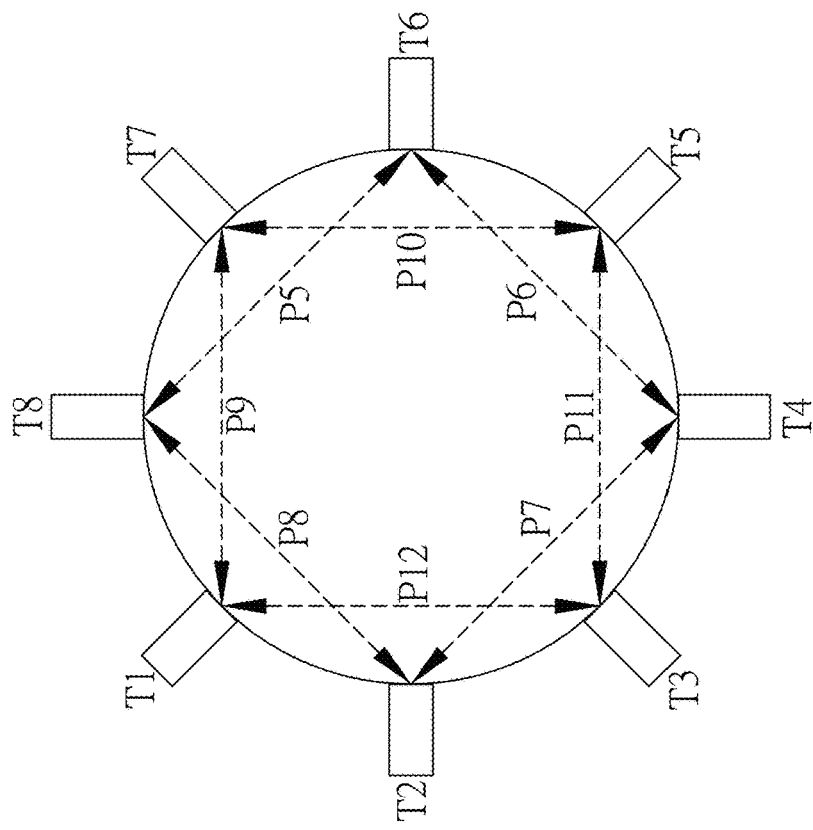
FIGS. 3A to 3D are schematic views of the acoustic paths of an embodiment.
Figure 3A:
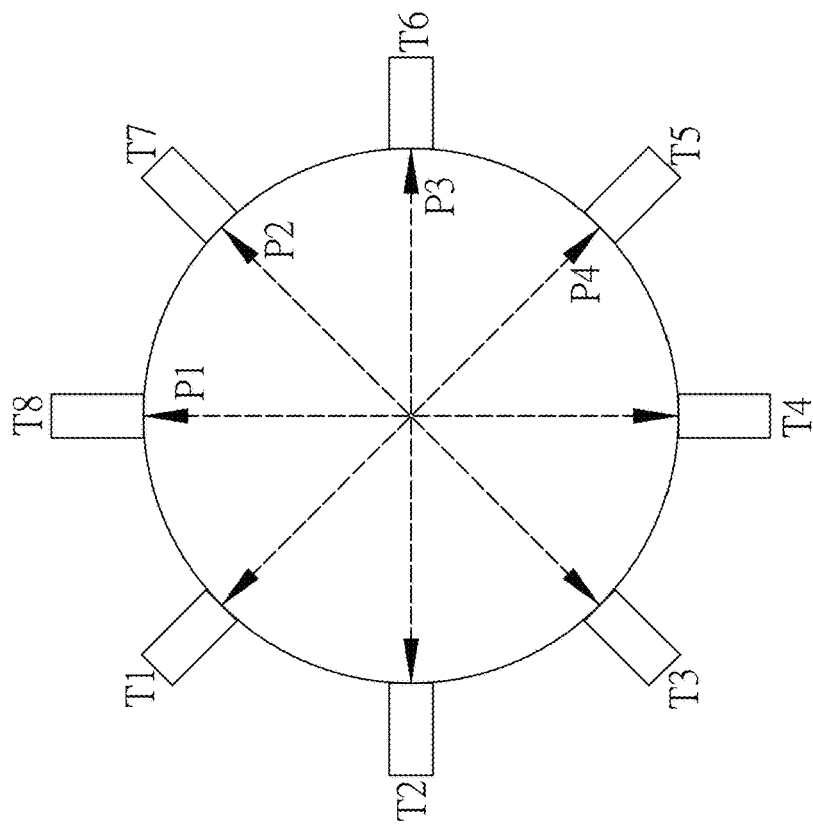
Figure 3D:
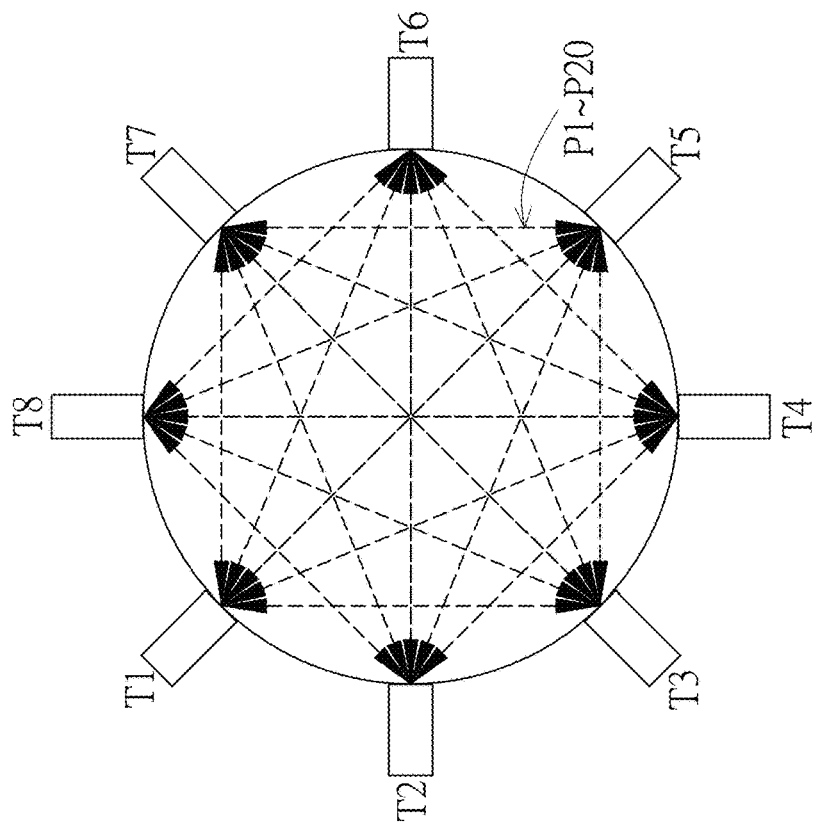
Figure 3C:
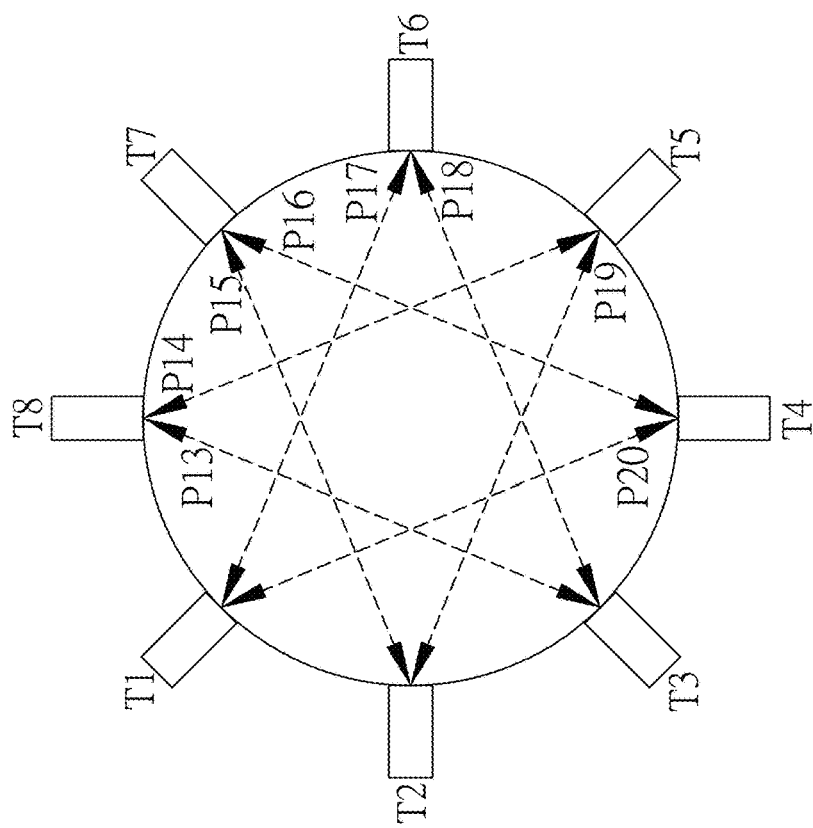

By adjusting the direction of the acoustic wave, the number of acoustic paths may be increased. Examples of such adjustments are: rearranging the direction of the transducers, using a known on-off time technique, using a phased array transducer or other possible methods. Any two transducers have one acoustic path. FIGS. 3A-3D show the acoustic paths between the transducers according to an embodiment. As shown in FIGS. 3A to 3C, the transducer T1 has five acoustic paths P4, P9, P12, P17, and P20 with transducers T3-T7 respectively. Therefore, as shown in FIG. 3D, there are twenty acoustic paths P1-P20 in the flow field 210. It should be noted that FIGS. 3A-3D are possible arrangements of the acoustic paths and FIGS. 3A-3D do not intend to limit the number of the acoustic paths. For example, once the transducer has a broader directivity, the transducer 1 will have two acoustic paths, one with transducer T2 and one with transducer T8, respectively.

Figure 4C:
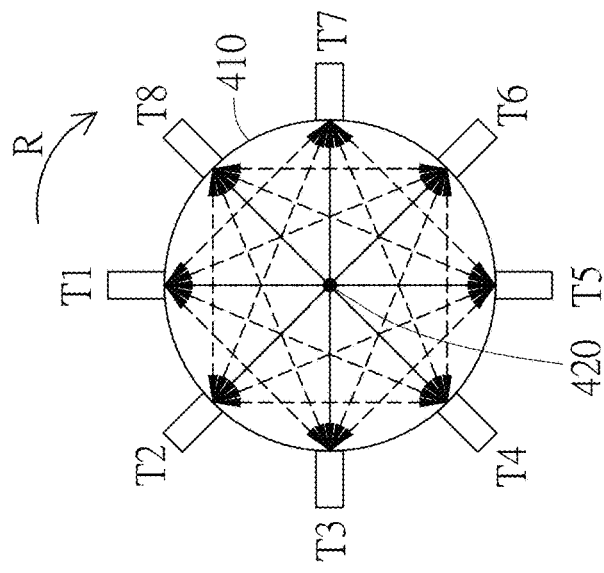
FIGS. 4A to 4C are schematic views of the chord-rotational method of an embodiment.
Figure 4B:
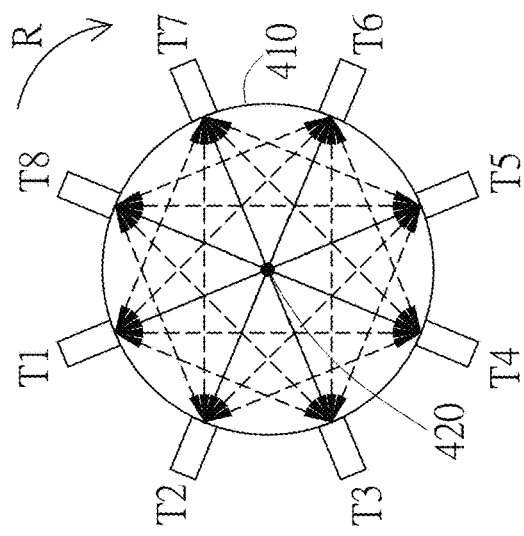
Figure 4A:
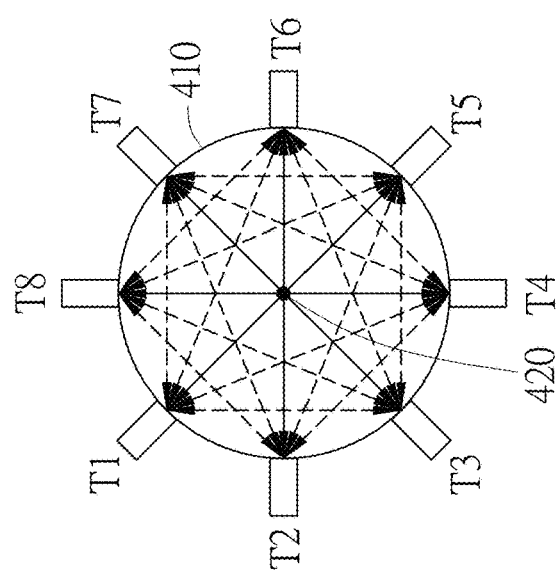

In addition, the number of acoustic paths can further multiply. FIGS. 4A-4C shows a chord-rotational method. As shown in FIGS. 4A-4B, the set of transducers T1-T8 rotate around the central axis 420 of the flow field 410. For example, the set of transducers T1-T8 rotate forty-four steps around the central axis 420 of the flow field 410, and each step equals one degree as shown in FIG. 4C. Therefore, the number of acoustic paths will increase forty-four times. There are eight hundred and eighty acoustic paths across the flow field 410. In this manner, most of the velocities at locations within the flow field 410 can be extracted and a unique feature for the flow field 410 can be built. Yet, the number of the rotation steps can be more or less than forty-four, depending on the user's need or other demands. The present invention is not limited by the number of the rotation steps.

Database

The database contains information or features of flow profiles. The database can be built by measuring real flow fields and extracting the features of real flow fields. More specifically, the database can be built by using the aforementioned transducers and the chord-rotation method to measure the flow rate profiles of the real flow fields. In addition, the database can also be built by simulating existing flow profiles data to get theoretical flow distributions. Examples include using known flow profiles to build models and using computational fluid dynamics (CFD) programs such as COMSOL or Fluent to extract the velocity profiles of the known flow profiles. Furthermore, the database can be used in the training of artificial intelligence (AI) algorithms or other deep learning systems. After training, the database will be optimized. The accuracy of the database will be increased by the prediction of the AI algorithm.

Detection

In general, the sensing mechanisms of the ultrasound flow meter can be based on Doppler Effect, through which the flow rate is measured by quantifying the shift of the frequency of acoustic wave, or Transit-time technologies, through which the flow rate is measured by quantifying the traverse time of the acoustic wave. Nevertheless, the sensing mechanisms of the ultrasound flow meters do not limit the present invention.

The distribution of the measuring flow of velocity on a chord of a flow field is a curve. Since the flow rate near the side of the flow filed is almost zero, the velocity at two sides of the chord of the flow field will be lower than the velocity in the center of the chord of the flow field. However, the curve will not always follow specific rules. Therefore, to make sure that the calculations are highly accurate, calculating methods including average rule, trapezoidal rule, Simpson's rule, Gaussian quadrature rule and a combination thereof are adopted. In addition, the real velocity of the measuring flow spans a range, for example from 0.001 m/s to 100 m/s.

The volumetric flow rate Q of a fluid which flows through a flow field with a cross-section area A is calculated using the equation (1.1) as follows. Wherein "v" represents the flow rate of the fluid.

$$Q = v \times A \tag{1.1}$$

In reality, we will have $Q_{real}$, which represents the real volumetric flow rate of the fluid, and $Q_{measuring}$, which represents the measuring volumetric flow rate of the fluid. If the measurement is accurate up to 100%, the ratio between $Q_{real}$ and $Q_{measuring}$ will be represented by equation (1.2).

$$\frac{Q_{measuring}}{Q_{real}} = 1 \quad (1.2)$$

However, in reality, the real volumetric flow rate of the fluid $Q_{real}$ will not equal to the measuring volumetric flow rate of the fluid $Q_{measuring}$. Therefore, a weighting function, $w_j$, is added to correct the errors of the measurements as shown in equation (1.3).

$$Q_{real} = Q_{measuring} \times w_j \quad (1.3)$$

Wherein the weighting function $w_j$ is provided by the database. The following paragraphs will show the means to select the weighting function $w_j$.

Comparison and Calibration

After an ultrasonic flow meter measures the flow rate of a fluid within a flow field, the velocities at the acoustic paths within the flow field can be extracted to build a unique feature map. The unique feature map will be compared against the database to select a flow profile most similar to the feature map in the database. The selected flow profile will be matched to a weighting function $w_j$ configured to calibrate the measured flow rate of the ultrasonic flow meter.

It should be note that the ultrasonic flow meter can be any conventional and/or commercial ultrasonic flow meters. The comparison can be performed by computer programs or AI. The comparison algorithm is selected from principal component analysis (PCA), non-negative matrix factorization (NNMF), artificial neural network (ANN), genetic algorithm with neural networks (GANN), support vector machine (SVM) or a combination thereof.

Flow Chart

Figure 5:
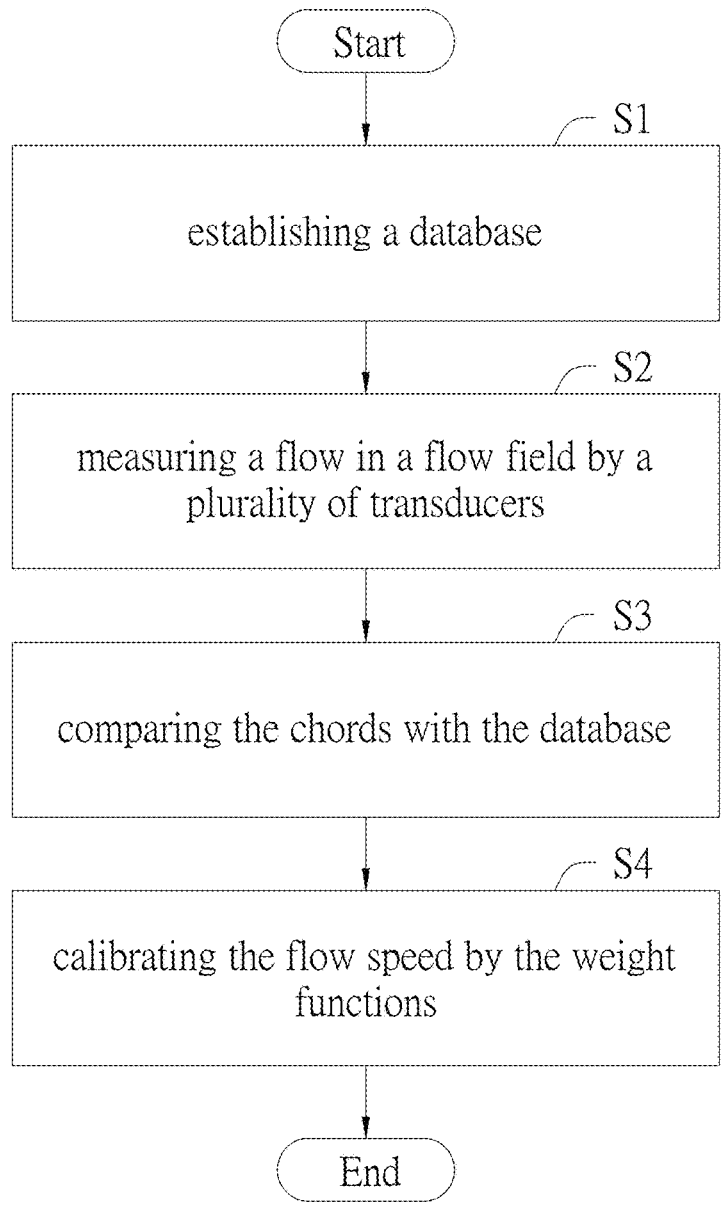
FIG. 5 shows a flow chart of the flow rate measuring method of an embodiment.

FIG. 5 shows a flow chart of the flow rate measuring method. As shown in FIG. 5, the flow rate measuring method comprises: S1: establishing a database including a plurality of flow profiles; S2: measuring the flow in a flow field by a plurality of transducers wherein in between every two transducers there exists an acoustic path which indicates the flow speed between the two transducers; S3: comparing the acoustic paths with the database and selecting a matching flow profile from the flow profiles, wherein the matching flow profile has a plurality of weighting functions corresponding to the acoustic paths; and S4: calibrating the flow speed using the weighting functions.

Although the present invention discloses the aforementioned embodiments, the aforementioned embodiments are not intended to limit the invention. Any person who is skilled in the art in connection with the present invention can make any change or modification without departing from the spirit and the scope of the present invention. Therefore, the scope of protection of the present invention should be determined by the claims in the application.

What is claimed is:

1. A flow rate measuring method, comprising:
   establishing a database including a plurality of flow profiles;
   measuring a flow in a flow field by a plurality of transducers, wherein each of two transducers have an acoustic path represented as a flow speed of the flow between the two transducers, wherein a feature map is derived by the flow speeds;
   comparing the feature map with the database and selecting a recognized flow profile from the plurality of flow profiles, wherein the recognized flow profile has a plurality of weight functions corresponding to the feature map; and
   calibrating the flow speed by a weight function of the plurality of weight functions.

2. The flow rate measuring method of claim 1, further comprising:
   simulating each of the plurality of flow profiles to get theoretical flow distributions, the database further including the theoretical flow distributions corresponding to the plurality of flow profiles.

3. The flow rate measuring method of claim 2, wherein the acoustic paths are composed as a measuring flow distribution, the theoretical flow distribution of the recognized flow profile is most likely the measuring flow distribution.

4. The flow rate measuring method of claim 1, wherein the comparing method is selected from PCA, NMF, NNMF, ANN, GANN, SVM or the combination thereof.

5. The flow rate measuring method of claim 1, wherein the number of the transducers is equal or more than 8.

6. The flow rate measuring method of claim 1, wherein the transducers are uniformly distributed around the flow field and outside the flow field.

7. The flow rate measuring method of claim 1, wherein the transducers are acoustic-based transducers.

8. The flow rate measuring method of claim 1, wherein the number of the transducers is equal or less than 8.

* * * * *